(12) United States Patent
Krichever et al.

(10) Patent No.: US 6,899,272 B2
(45) Date of Patent: May 31, 2005

(54) BIOPTICS BAR CODE READER

(75) Inventors: Mark Krichever, Hauppauge, NY (US); Mehul Patel, Fort Salonga, NY (US)

(73) Assignee: Symbol Technologies, INC, Holtsville, NY (US)

( * ) Notice: Subject to any disclaimer, the term of this patent is extended or adjusted under 35 U.S.C. 154(b) by 447 days.

(21) Appl. No.: 09/756,438

(22) Filed: Jan. 8, 2001

(65) Prior Publication Data

US 2001/0042789 A1 Nov. 22, 2001

Related U.S. Application Data

(60) Provisional application No. 60/204,689, filed on May 17, 2000.

(51) Int. Cl.[7] ................................................. G06K 7/10
(52) U.S. Cl. ........................... 235/462.37; 235/462.01; 235/462.22; 235/462.32; 235/462.36; 235/440
(58) Field of Search ................................ 235/439, 440, 235/454, 462.01, 462.22, 462.32, 462.36

(56) References Cited

U.S. PATENT DOCUMENTS

| | | | |
|---|---|---|---|
| 3,728,677 A | * | 4/1973 | Munson ................. 340/146.3 F |
| 3,947,816 A | * | 3/1976 | Rabedeau ............. 340/146.3 Z |
| 4,713,532 A | * | 12/1987 | Knowles ..................... 235/467 |
| 5,495,097 A | | 2/1996 | Katz et al. |
| 5,723,852 A | * | 3/1998 | Rando et al. ................ 235/467 |
| 5,744,790 A | * | 4/1998 | Li ............................... 235/472 |
| 5,801,370 A | * | 9/1998 | Katoh et al. ................. 235/467 |
| 5,834,708 A | * | 11/1998 | Svetal et al. ................. 177/180 |
| 5,886,336 A | * | 3/1999 | Tang et al. .................. 235/462 |
| 5,914,477 A | * | 6/1999 | Wang et al. ............. 235/462.1 |
| 5,936,218 A | * | 8/1999 | Ohkawa et al. ......... 235/162.39 |
| 5,952,642 A | | 9/1999 | Lutz |
| 5,962,838 A | * | 10/1999 | Tamburrini ............ 235/462.45 |
| 5,967,264 A | | 10/1999 | Lutz et al. |
| 6,032,128 A | | 2/2000 | Morrison et al. |
| 6,047,262 A | | 4/2000 | Lutz |
| 6,056,087 A | | 5/2000 | Addy et al. |
| 6,076,735 A | * | 6/2000 | Saegusa .................... 235/462.4 |
| 6,080,938 A | | 6/2000 | Lutz |
| 6,089,454 A | | 7/2000 | Sadler |
| 6,105,866 A | | 8/2000 | Morrison et al. |
| 6,112,857 A | | 9/2000 | Morrison |
| 6,155,486 A | | 12/2000 | Lutz |
| 6,167,381 A | | 12/2000 | Swaine et al. |
| 6,189,790 B1 | | 2/2001 | Walter |
| 6,330,975 B1 | * | 12/2001 | Bunte et al. ........... 235/472.01 |

FOREIGN PATENT DOCUMENTS

TW 399757 6/1987

* cited by examiner

*Primary Examiner*—Karl D. Frech
*Assistant Examiner*—Daniel A. Hess
(74) *Attorney, Agent, or Firm*—Kirschstein, et al.

(57) ABSTRACT

A bioptics bar code reader has first and second windows disposed at an angle to each other, a first imager for the first window and a second imager for the second window and first and second optics for directing light from a bar code in a reading area between the windows to the first and second imagers. The two imagers each obtain an image of the bar code in the reading area.

5 Claims, 2 Drawing Sheets

BIOPTICS BAR CODE READER

CROSS REFERENCE TO RELATED APPLICATIONS

This application claims priority to U.S. Prosvisional Application No. 60/204.689 filed May 17, 2000.

BACKGROUND OF THE INVENTION

The present invention relates to the reading of dataforms, such as bar codes, by the use of imagers in slot or presentation mode scanners.

The reading of bar codes by imagers is known, and imagers, such as charge coupled detector (CCD) arrays or CMOS sensors, have been disclosed in U.S. Pat. No. 5,319,181, the disclosure of which is incorporated herein by reference. Such imagers are also referred to as cameras, sensors and the like.

It is proposed that the use of two images of the same bar code from two different views will aid in the speed and reliability of decoding bar codes which have been captured as an image in an imager.

Moreover, although two-dimensional bar codes have been increasing in use, there are currently no presentation or slot scanners available in the market today that can read a two-dimensional bar code from two sides of a package.

SUMMARY OF THE INVENTION

The main object of the present invention is to improve the slot scanners that are presently available.

Another object of the present invention is to provide a bioptics reader which reads bar codes using area sensor cameras which can process the signals in sequence or in parallel with the capability of taking and storing one-dimensional pictures and increasing the reliability of the system by eliminating any moving parts.

In accordance with the present invention, this object is achieved by two or more area imagers positioned within the bioptics scanner or reader in such a manner that their fields of view cover a three-dimensional space where a bar code can be presented or an identification document might be seen by the imagers. Liquid crystal displays or other conventional displays can also be used by being mounted in front of an operator so that the operator will be able to see the views of the cameras in real time. In addition, illumination lights can be mounted inside of the slot scanner, so that the numerical apertures of the camera or imager can be optimized for the deepest depth of focus.

Another object of the present invention is to provide a bioptics scanner or reader for a slot or presentation mode which is capable of reading one and two-dimensional bar codes.

This object is achieved in accordance with the present invention by the use of two transparent scanning surfaces or windows which are at an angle to one another, two fixed mirrors and one moving mirror for use with a single image sensor. The image sensor is preferably an interlaced image sensor, however, any image sensor can be used wherein one can expose the photodetector at two separate times in one frame.

In accordance with the invention, the mirror is moved between positions and an even field of the image sensor is exposed obtaining the image of the side of the package facing the horizontal scanning surface. When the mirror is in a second position, the odd field of the image sensor is exposed resulting in an image of the package facing the vertical scanning surface. This results in one frame of a scanner having two views of the different sides of the package. Once the images are obtained, the bar code and the image can be located and decoded. To increase the speed of operation, one can either start decoding a particular odd or even field while the other is being read out or one can process the two at once. The current transport speed of the package can be 50 inches per second, however, higher speeds can be achieved by optimizing the hardware and software of the system.

These and other features of the present invention will be disclosed in more detail from the following detailed description taken with the attached drawings, wherein:

DETAILED DESCRIPTION OF THE INVENTION

Figure 1:
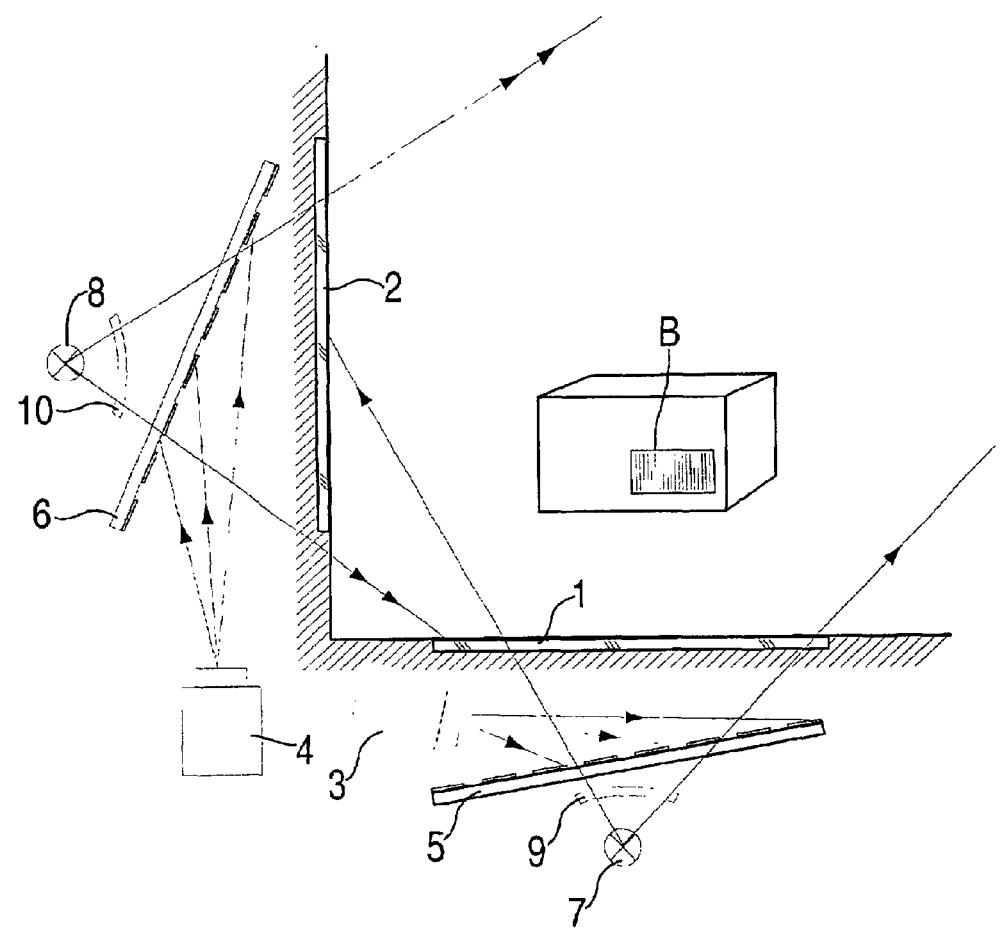
FIG. 1 is a partial sectional view of a bioptics slot or presentation mode scanner in accordance with the present invention.
Figure 2:
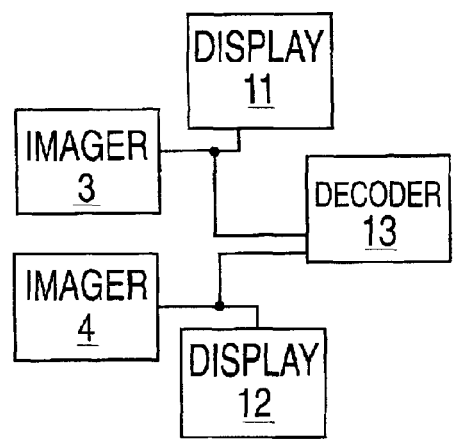
FIG. 2 is a schematic of the circuitry of the scanner of FIG. 1.

Referring now to FIGS. 1 and 2, a first embodiment of the bioptics scanner according to the present invention is disclosed.

In a slot and/or presentation mode scanner, there are two windows 1 and 2 which are at an angle to each other. Although the windows 1 and 2 are at a 90° angle in FIG. 1, other angles can be used. In FIG. 1, window 1 is a horizontal window and window 2 is a vertical window, however, other orientations can also be used within the scope of the invention.

Behind the windows 1 and 2 are two dimensional array cameras 3 and 4 respectively which are positioned with regard to mirrors 5 and 6 so that their fields of view cover a three-dimensional space where a bar code B can be presented on a three-dimensional object or an identification document, such as a coupon, might be presented. Mirrors 5 and 6 are stationary mirrors which reflect light from the bar code B onto imagers 3 and 4 respectively.

In order to improve the depth of focus of the imagers 3 and 4, illumination lights 7 and 8 are disclosed behind the windows and optionally utilized light condensers 9 and 10 respectively. Mirrors 5 and 6 are light dividing mirrors, so that light from the light sources 7 and 8 can pass therethrough and light returning from the bar code can be reflected to the cameras or imagers 3 and 4. By use of the illumination lights, the cameras can have their numerical apertures optimized to obtain the maximum depth of focus.

In a preferred embodiment of the present invention, LCD or other conventional displays 11 and 12 are associated with the imagers 3 and 4, so that the operator can see the views of the cameras or imagers 3 and 4 respectively.

The outputs of the imagers 3 and 4 are also connected to a decoder 13 which has the capability of processing the signals from the two imagers either sequentially or in parallel. The decoder 13 can perform the decoding in parallel by having two duplicate circuits, each servicing one imager.

Figure 3:
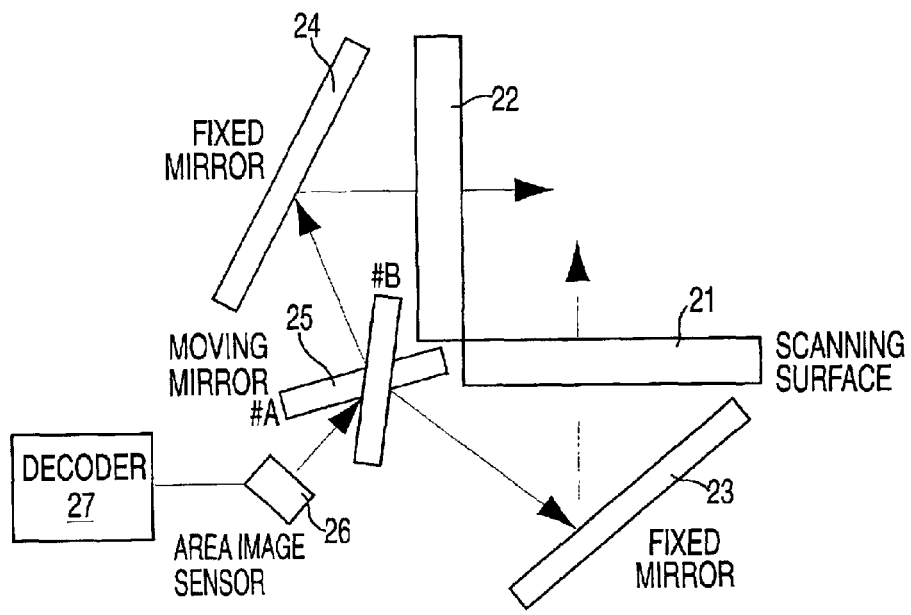
FIG. 3 is a schematic of an alternative embodiment of a bioptics scanner according to the present invention.

FIG. 3 illustrates another embodiment of the present invention, wherein two windows 21 and 22 have two fixed mirrors 23 and 24 associated therewith and a single imager 26. A moveable mirror 25 is disposed between the mirrors 23 and 24 and is moveable between two positions marked A and B in FIG. 3. The output of the imager 26 is fed to a decoder 27.

Figure 4:
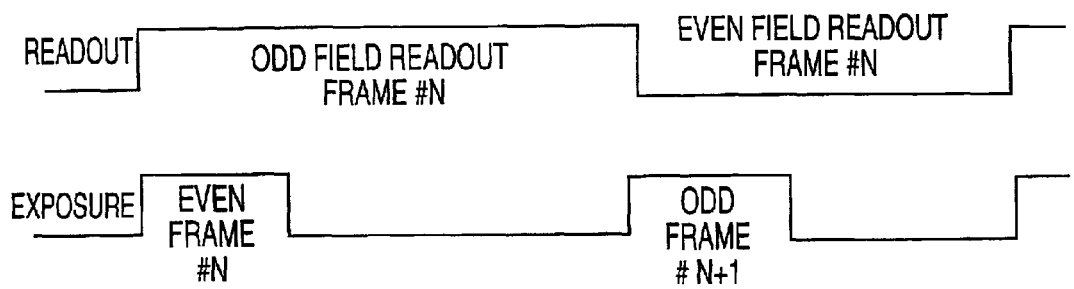
FIG. 4 is a timing diagram showing the sequence of events of operation for the scanner of FIG. 3.

With reference to FIG. 4, the operation of the embodiment of FIG. 3 will now be explained. The imager 26 is preferably an interlaced image sensor which has even fields, i.e., lines 2, 4, 6, 8, 10 . . . , and odd fields, i.e., lines 1, 3, 5, 7, 9 . . . . When the mirror is in position A, the even field of the imager is exposed and an image of the side of the package facing the horizontal scanning window 21 is obtained. When the mirror is in the position B, the odd field of the imager 26 is exposed resulting in an image of the packaging facing the vertical scanning window 22. This results in one frame of the scanner having two views of the different sides of the package.

Once the images are obtained, the bar code and the image can be located and decoded by decoder 27. To increase the speed of operation, one can start decoding a particular (odd or even) field while the other is being read out, as is shown in FIG. 4. The transport speed of the package for the present invention is 50 inches per second, however, higher speeds can be achieved by optimizing the hardware and software.

It is understood that the embodiments described hereinabove are merely illustrative and are not intended to limit the scope of the invention. It is realized that various changes, alterations, rearrangements and modifications can be made by those skilled in the art without substantially departing from the spirit and scope of the present invention.

What is claimed is:

1. A reader for electro-optically reading a bar code symbol on a target coniprising:

a) a first light-transmissive stationary window and a second light-transmissive stationary window disposed at an angle to each other and bounding a reading area in which the target bearing the symbol to be read is moved relative to the stationary windows during reading;

b) first capture optics for optically capturing light from the symbol passing in a first direction through the first window;

c) second capture optics for optically capturing light from the symbol passing in a second direction through the second window;

d) a common mirror movable between a first position and a second position; and e) a common two-dimensional imager having multiple sensors for imaging a first two-dimensional image of the entire symbol from the light captured by the first capture optics and directed to the imager by the mirror in said first position, and for imaging a second two-dimensional image of the entire symbol from the light captured by the second capture optics and directed to the imager by the mirror in said second position;

f) wherein said first and second two-dimensional images are of the same entire symbol but captured by light passing in said first and second directions which are different and at an angle to each other, wherein said first and second two-dimensional images are contained on different image lines of a frame generated by the imager, and wherein the first two-dimensional image is contained within the even image lines, and wherein the second two-dimensional image is contained within the odd image lines, of the frame.

2. The reader of claim 1, wherein the imager is a charge coupled device (CCD) array extending along mutually orthogonal rows and columns.

3. The reader of claim 1, and a decoder for sequentially processing the first and the second images.

4. The reader of claim 1, and a decoder for simultaneously processing the first and the second images.

5. The reader of claim 1, wherein each of the first and the second capture optics is a stationary fold mirror.

* * * * *